(12) United States Patent
Childs et al.

(10) Patent No.: US 7,707,630 B2
(45) Date of Patent: Apr. 27, 2010

(54) REMOTE AUTHENTICATION CACHING ON A TRUSTED CLIENT OR GATEWAY SYSTEM

(75) Inventors: Philip Lee Childs, Raleigh, NC (US); Michael T. Vanover, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 387 days.

(21) Appl. No.: 11/763,756

(22) Filed: Jun. 15, 2007

(65) Prior Publication Data
US 2008/0066166 A1 Mar. 13, 2008

Related U.S. Application Data

(63) Continuation of application No. 10/064,275, filed on Jun. 27, 2002, now Pat. No. 7,234,157.

(51) Int. Cl.
*G06F 15/16* (2006.01)

(52) U.S. Cl. .................. 726/12; 726/2; 726/5; 713/182

(58) Field of Classification Search ............... 726/2–4, 726/12, 16, 17–19, 1, 5, 6, 8, 21; 713/155, 713/156, 170, 182; 709/217–219, 223–225, 709/229; 705/50, 66, 67; 707/9, 10
See application file for complete search history.

(56) References Cited

U.S. PATENT DOCUMENTS

| | | | |
|---|---|---|---|
| 5,560,008 | A | 9/1996 | Johnson et al. |
| 5,689,638 | A | 11/1997 | Sadovsky |
| 5,757,920 | A | 5/1998 | Misra et al. |
| 5,923,756 | A | 7/1999 | Shambroom |
| 5,991,810 | A | 11/1999 | Shapiro et al. |
| 6,157,953 | A | 12/2000 | Chang et al. |
| 6,189,146 | B1 | 2/2001 | Misra et al. |
| 6,192,408 | B1 | 2/2001 | Vahalia et al. |
| 6,198,824 | B1 | 3/2001 | Shambroom |
| 6,327,677 | B1 | 12/2001 | Garg et al. |

(Continued)

FOREIGN PATENT DOCUMENTS

EP 0949788 A1 10/1999

(Continued)

OTHER PUBLICATIONS

"Voice Cybervault for Local and Internet Logins", Research Disclosure, Mar. 2000, No. 431176, pp. 586-687.

*Primary Examiner*—Kimyen Vu
*Assistant Examiner*—Nirav Patel
(74) *Attorney, Agent, or Firm*—Patrick J. Daugherty; Driggs, Hogg, Daugherty & Del Zoppo Co., LPA

(57) ABSTRACT

In a system providing for user access of secure resources upon user authentication by a remote authentication server, a successful user authentication is saved locally for use when the authentication server is not available. The successful user authentication returns an authenticated credential which is stored on the local client utilizing a security method such as Public Key Infrastructure which prevents tampering with the credential. If a gateway machine provides connectivity between the client and the authentication server, the credential is also stored on the gateway.

17 Claims, 3 Drawing Sheets

U.S. PATENT DOCUMENTS

| | | |
|---|---|---|
| 6,463,474 B1 | 10/2002 | Fuh et al. |
| 6,865,574 B1 | 3/2005 | McCullough |
| 6,981,145 B1 | 12/2005 | Calvez et al. |
| 2002/0133723 A1 | 9/2002 | Tait |

FOREIGN PATENT DOCUMENTS

| | | |
|---|---|---|
| WO | 0057315 A3 | 9/2000 |

REMOTE AUTHENTICATION CACHING ON A TRUSTED CLIENT OR GATEWAY SYSTEM

RELATED APPLICATION

This application is a continuation of application Ser. No. 10/064,275, filed Jun. 27, 2002.

BACKGROUND OF INVENTION

As computer networks proliferate and the use of the internet, intranets and other remote methods of providing computer resources and services become more popular, the problem of authenticating users becomes more and more important. It is imperative for providers of resources such as banking services, databases holding personal or other sensitive information and internal company resources, for example, to be able to reliably identify users attempting to access their resources. As such, well known standards and methods have been developed to provide for user authentication. Many such standards and methods involve the remote exchange of some type of user authentication credential.

A user attempting to access a secure resource might be asked to enter some identifying information, such as a user id and/or a password. Behind the scenes and transparent to the user, the user's system would send the identifying information to an authentication server connected to the user's system via a network, such as the internet. Assuming the authentication server recognizes the identifying information as associated with an authorized user, an authenticated credential would be returned to the user's system, with which the user would be allowed to access the requested resource. The nature of the identifying information and the methods used by the user's system and the authentication server to verify the user's right to access the resource can all be in accordance with any one of the well-known standards regarding such functions. These methods and standards are easily identified by those skilled in the relevant arts.

One popular standard that has been developed for remote authentication of users is the Light-weight Directory Access Protocol (LDAP). LDAP may be used to authenticate users to access resources that may reside locally or remotely to the user. Typically, especially in small business environments, the LDAP server is located remotely from the user. Utilizing a remote LDAP server provided through a service provider allows the small business to save the cost of providing its own local LDAP servers. Connectivity to the LDAP server is provided via the internet, an intranet or other computer network. FIG. 1 shows one possible LDAP configuration. The user's system (or client) 10 is located on a local area network (LAN) 20 to which resources 30 are also connected. These resources can include various media such as databases or world-wide web content or computer-implemented services such as banking services, training courseware, etc. Some of these resources 30 may be secure resources, the use of which requires user authentication. The client 10 is also connected to a computer network 40, such as the internet or an intranet, via a secure gateway machine 50. The gateway machine 50 may provide connectivity to the network for other clients (not shown) as well. The presence of the gateway 50 is optional as the client 10 may be connected directly to the computer network 40. Also connected to the network 40 is an LDAP server 60 for providing LDAP user authentication services for the client 10 and other systems utilizing its services (not shown) and other secure resources (30) which may be accessed by the client 10.

In order to access resources 30 which require user authentication, the client 10 must contact the LDAP server 60 and receive an authenticated credential. When the LDAP server is unavailable, such as when any of the connections between the client and the LDAP server are down (i.e., the client-gateway connection, the gateway-network connection or the network-LDAP server connection) or when the LDAP server or the gateway machine is down, user authentication is not possible and the user is unable to access the desired secure resource(s). In the case of a business environment, this can cause serious productivity losses.

In some instances, some resources 30 may be located on the client machine 10. Authentication of the user by the LDAP server 60 would still be required before the user could access such resources. In the case where the client 10 is a mobile computer, the client will often be disconnected from the network. In such an instance, the user would be unable to access the secure resources on the mobile client because there would be no connectivity to the LDAP server. Again, serious productivity losses could result.

For these reasons, and others readily identified by those skilled in the art, it would be desirable to develop techniques to allow user's some access rights to secure resources when a remote authentication server is unavailable while maintaining a high degree of trust.

SUMMARY OF INVENTION

The present invention contemplates a method whereby a user may access secure resources requiring user authentication when the remote authentication server is unavailable. This method is applicable to any user authentication method or standard requiring an exchange with a remote server of some type of credential. The present invention does not require any changes to the user authentication method or standard. In realizing these and other purposes of the present invention, a method calls for a client machine to locally store the authenticated credential received from the authentication server during a successful user authentication. The credential is stored in a manner that makes tampering or falsifying the authenticated credential difficult or impossible. One example of a method of protecting the credential is hardware-based Public Key Infrastructure, or PKI, but any other appropriate method may be used. Where the client machine is connected to the authentication server via a secure gateway machine, the credential may also be stored in a similarly-secured manner on the gateway machine. Then, if a later requested user authentication fails due to a lack of availability of the authentication server, the authenticated credential on the client machine and/or the gateway machine can be used to allow the user access to the secure resource. Access to secure resources using a locally-stored credential may be limited by system policies limiting the amount of time since the last remote server authentication or other policies ensuring the security of the resource. Also, some especially sensitive resources may have associated policies that are more demanding, accepting only credentials from the gateway machine or the remote server itself.

BRIEF DESCRIPTION OF DRAWINGS

Some of the purposes of the invention having been stated, others will appear as the description proceeds, when taken in conjunction with the accompanying drawing, in which.

DETAILED DESCRIPTION

While the present invention will be described more fully hereinafter with reference to the accompanying drawings, in which a preferred embodiment(s) of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Devices and systems implementing the LDAP standard method of remote authentication, and other remote authentication mechanisms to which the present invention may be applied, are well known to persons skilled in the relevant arts. Such devices and systems may be implemented in any of the many alternate embodiments that are available without departing from the spirit of the present invention. Detailed descriptions of such devices and systems, and the underlying remote authentication mechanisms, are not required for an understanding of the present invention. This invention relates to an improvement to the method of operation of such devices and systems.

The figures and examples given in this description often reference the LDAP remote authentication standard and include an LDAP server as a component. The use of these specific examples is not to be read as limiting on the present invention in any way and is simply illustrative of one configuration to which the present invention is applicable. The present invention is equally applicable to other user authentication mechanisms which utilize a remote authentication device and the exchange of any type of authenticated credential which could be saved for later use in authenticating a user as described herein.

Figure 1:
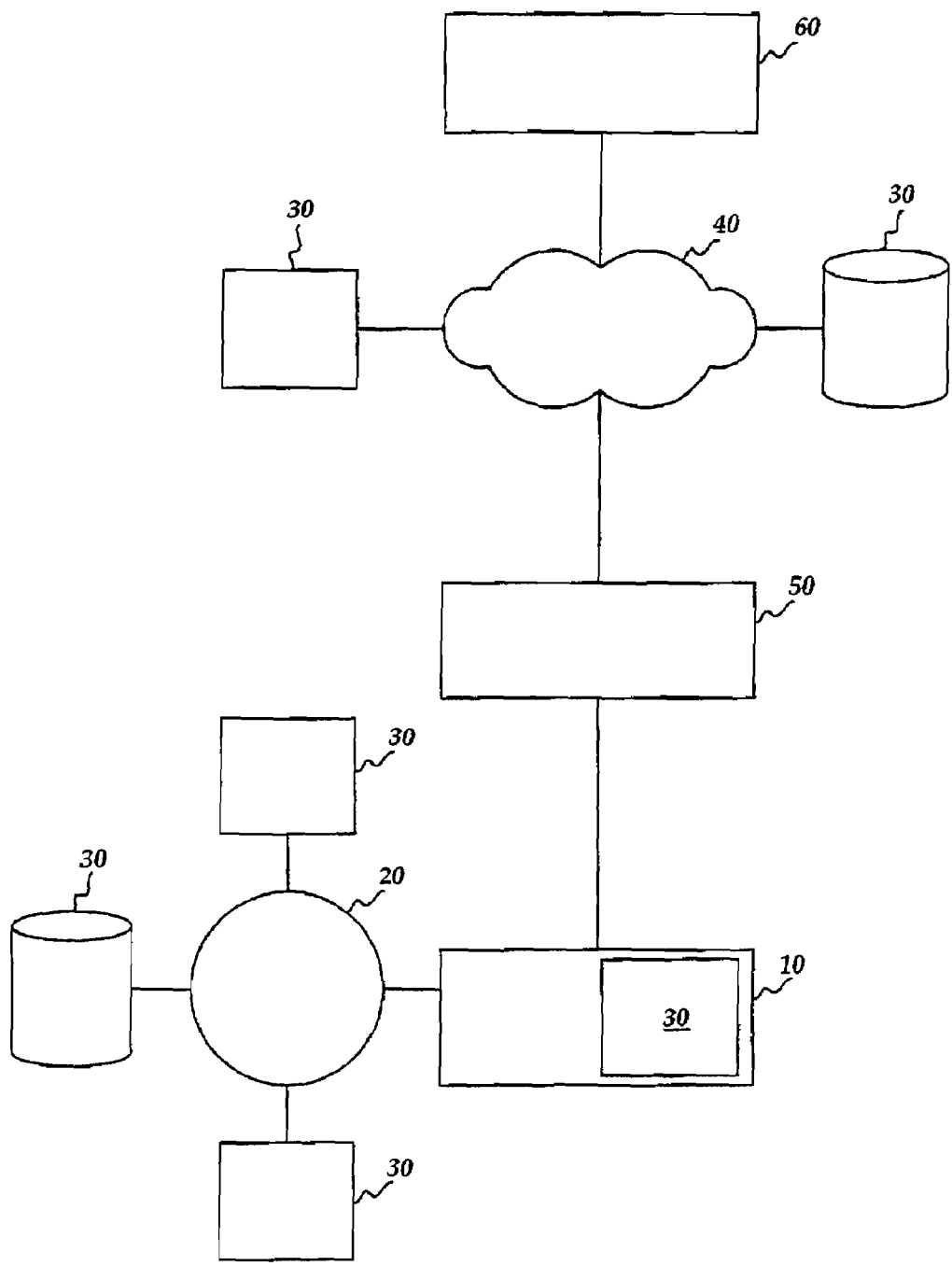
FIG. 1 is a block diagram showing one system configuration to which the present invention may be applied.

In accordance with the present invention, and with reference to FIG. 1, a user's computer system (referred to herein as a client or a client computer) 10 operates on a local area network (LAN) 20 or other type of local network. The local network also includes other computing devices, some of which house services or other resources which may be accessed from the client and which require user authentication before access is granted 30 (collectively referred to herein as secure resources). The client 10 may also itself house secure resources 30. The client 10 is also connected to a network providing more global access 40, such as a company-wide intranet or the worldwide communications network known as the internet. Through this global network, the client 10 is connected to a remote authentication server 60. The client may also access secure resources 30 located on the global network 40.

Connectivity from the client 10 to the global network 40 may optionally be provided through a secure gateway machine 50. The gateway machine 50 may connect several local clients (not shown) to the global network 40, centralizing the connections and providing a level of security between the clients, the LAN 20 and the global network 40.

Figure 2:
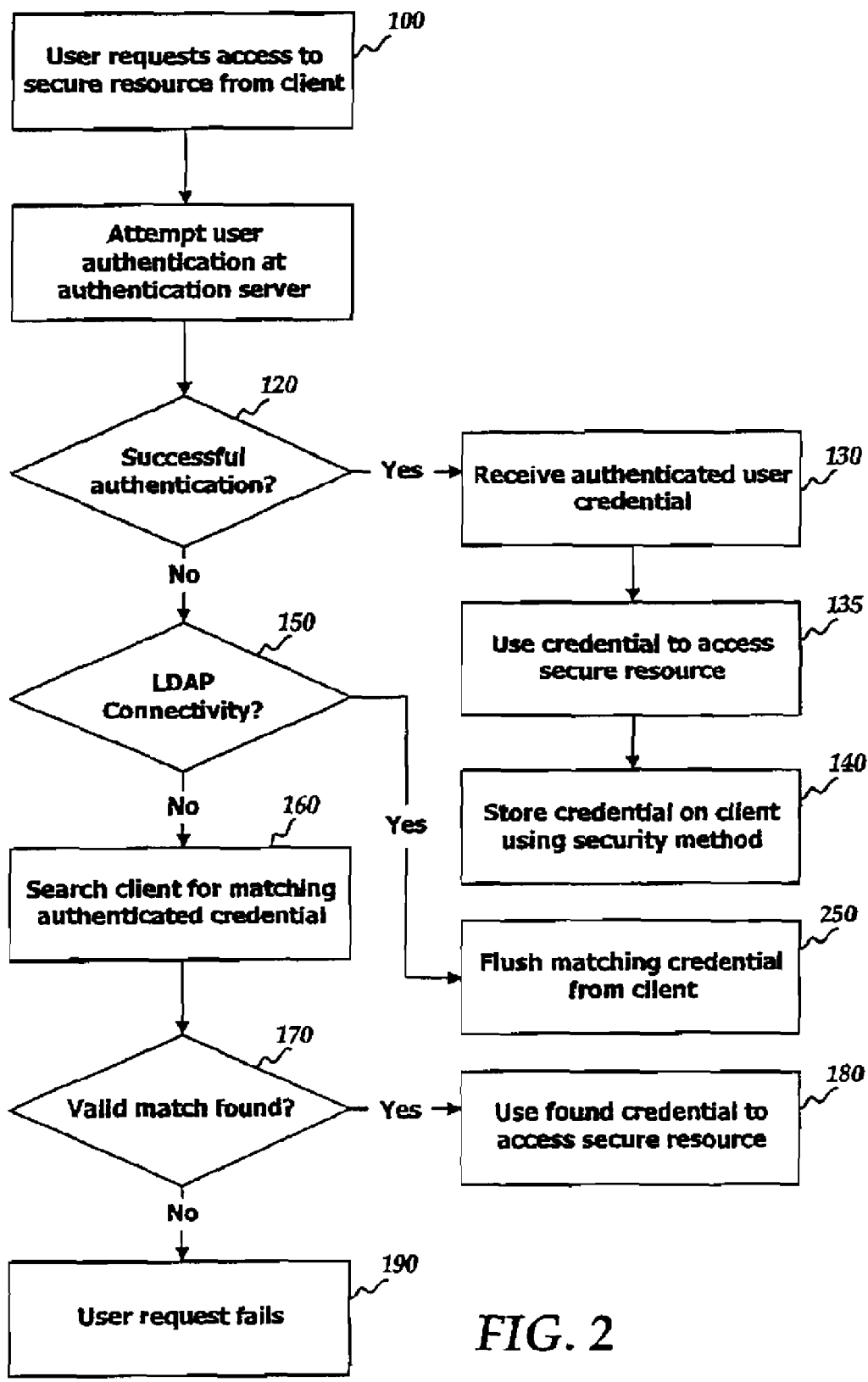
FIG. 2 is a flow-chart illustration of a system operating according to the present invention.

With reference to FIG. 2, when a user at the client attempts to access 100 a secure resource, whether locally or remotely, a user authentication is attempted 110 with an LDAP server. If the user authentication is successful 120, an authenticated credential is returned to the client by the authorization server 130. The authenticated credential is unique to the authenticated user and allows the client to access the requested secure resource 135.

When operating in accordance with the present invention, the authenticated credential is securely cached 140 on the client machine and, if one is present, on the gateway machine. In order to protect the credential from being tampered with or falsified, the credential must be stored in a protected manner. This may be done using any one of the many methods known for such purposes to those skilled in the relevant arts. As an example, the credential may be protected by Public Key Infrastructure (PKI). The PKI standard provides for a method whereby the credential is encrypted before storing, preventing anyone from discovering its contents. PKI also provides the credential with a digital signature to detect whether the contents have been altered. The PKI method includes a Key which is stored on the client and which is used to encrypt and decrypt the credential. For an additional level of security, hardware-based PKI may be used wherein the Key is stored in hardware as opposed to the client's disk drive. This makes it much more difficult for a hacker to discover the Key. There are many other types of encryption and other security measures which may be applied to the stored credential, any of which may be used with the present invention. The various types of security measures available provide varying levels of security and require varying levels of complexity in implementing. The choice of a protection measure for a particular application is a selection to be made based on the level of sensitivity of the secure resources to be protected balanced against the available resources for implementation.

In accordance with the present invention, if a user authentication request fails 120, the client determines whether connectivity to an operative LDAP server is available 150. This determination may be performed using any method or technique known to those with reasonable skill in the relevant arts. Such connectivity will not be available if the user authentication request failed because a connection between a client and the LDAP server is broken or because the LDAP server itself is down. If such connectivity is not available, the client checks the client machine for an authenticated credential matching the user whose authentication request failed 160. This search will necessarily involve decrypting the authenticated credential using whatever encryption method was used to protect the credential and verifying that the credential has not been tampered with. If a valid match is found 170, the user may access the requested resource using the locally stored credential 180. If no valid matching authenticated credential is found, the request to access the secure resource fails 190.

A system operating in accordance with the present invention may optionally implement system security policies limiting the use of local credentials for accessing secure resources. For example, very sensitive resources may be defined by the system security policies as always requiring user authentication by an LDAP server. Less sensitive resources may require the last LDAP server authentication to have been received less than a certain number of hours prior to the current request. Still less sensitive resources might allow local credentials to be used without restriction. System security policies may be designed using any criteria known to those of reasonable skill in the art in order to appropriately protect the secure resources of varying levels of sensitivity.

Figure 3:
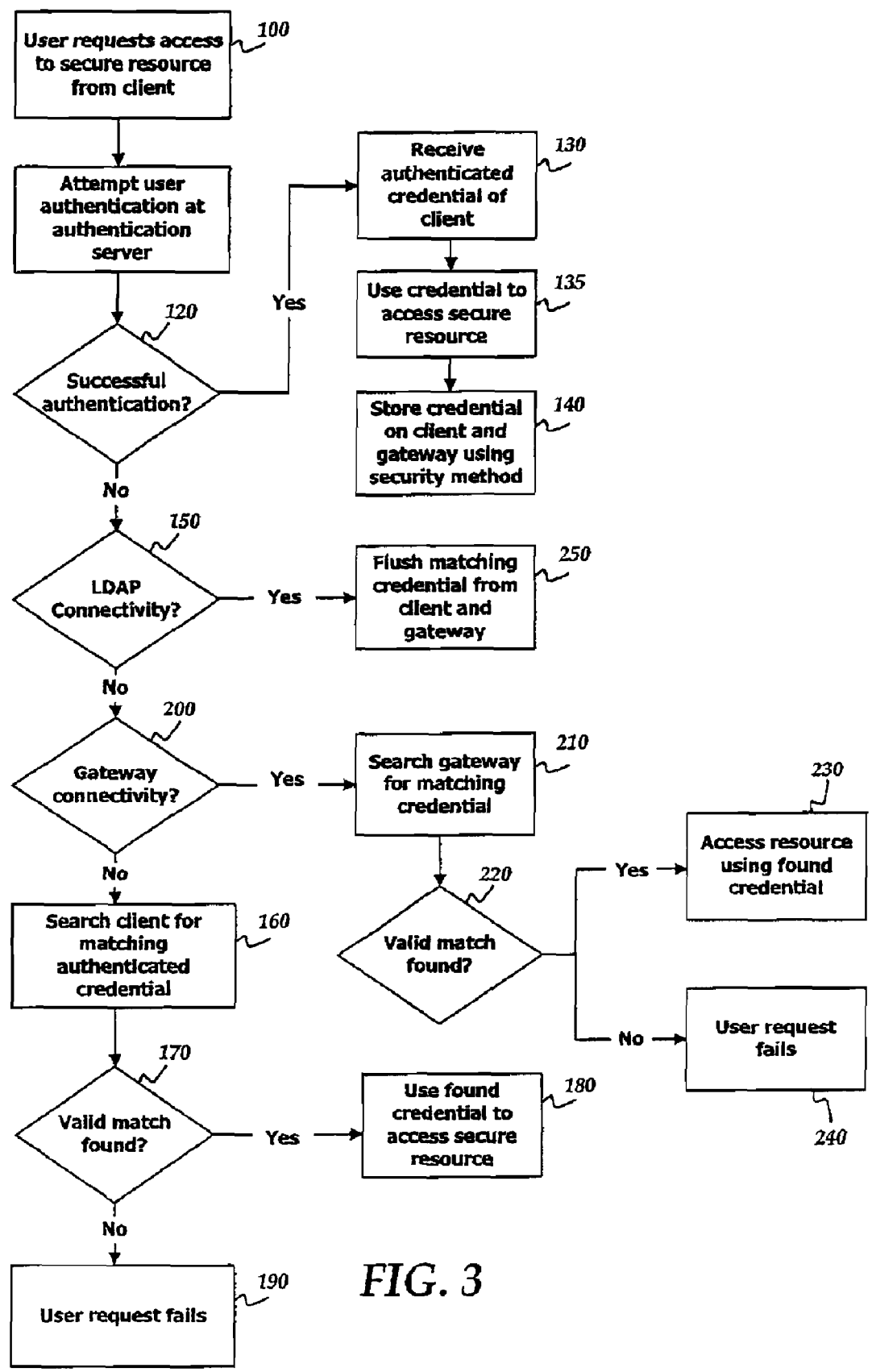
FIG. 3 is a flow chart illustration of another embodiment of a system operating according to the present invention.

Referring now to FIG. 3 in a system including a secure gateway machine as described above, when a user authentication fails due to lack of connectivity to an operative LDAP server 150, the next step is to test for connectivity to an operative gateway machine 200. If such connectivity exists, the client checks the gateway 210 for an authenticated credential matching the user whose authentication request failed. Again, this search will necessarily involve decrypting the authenticated credential using whatever encryption method was used to protect the credential and verifying that the credential has not been tampered with. If a valid match is found 220, the user may access the requested resource using the authenticated credential found on the gateway 230. If no valid matching authenticated credential is found on the gateway 220, the request to access the secure resource fails 240.

The use of a gateway-stored credential is considered preferable to a credential stored on the client. The gateway machine is typically a secure machine utilizing network firewall software to isolate the gateway from unwanted intrusions from connected networks and is often maintained at a secure site. Also, since a gateway often provides connectivity to the global network for several (or many) clients, the likelihood of finding a matching authenticated credential is greater. Finally, in environments where users may use more than one network-attached workstation within the local network, all connecting to the global network through the gateway, once the user has been authenticated, the corresponding credential will reside on the gateway and the user may be authenticated at the gateway from any of the locally-networked workstations.

Again, a system operating in accordance with the present invention may optionally implement system security policies selectively limiting access to sensitive resources using credentials not provided by the LDAP server. These limitations could also apply to gateway-stored credentials. Because gateways are typically more secure than clients, policies would typically allow access to more sensitive resources using gateway credentials than with locally-stored credentials. As stated above, system security policies can be designed by those reasonably skilled in the art as they feel appropriate under the circumstances.

If, when a user authentication request fails in a system including a gateway machine, no connectivity is available to an operative LDAP server or an operative gateway, the local client is searched 160 and a matching locally-stored authenticated credential used 180, if applicable, as discussed above.

In the situation where a user authentication request has failed but connectivity to an operative LDAP server is available 150, this indicates that a submitted user identification has been identified as not authorized to the requested resource. In accordance with the present invention a search is made of the client and the gateway, if applicable, for any earlier-authenticated credentials matching the user who has been denied authentication. Any matching credentials are flushed from the secure cache(s) 250 to ensure that user is not able to use the stored credentials to improperly access the secure resource(s). This situation could occur, if, for example, a user was authorized to a resource for a time but the authorization later expired or was revoked.

With respect to the functions and processes described and illustrated herein, each may be embodied in electronic circuitry (or hardware) or as a series of computer programming code instructions (or software) implementing the functions or steps described, or as a combination of hardware and software. For example, in this description and in the following claims where the client 10 (FIG. 1) is said to take some action or perform some function, that action or function may be effected by the execution of software in the memory (not shown) of client 10 as is well known by persons skilled in the relevant arts. Alternatively, such action or function may be effected by instructions implemented in the circuitry (not shown) of client 10, again, using techniques well known by those skilled in the relevant arts.

As readily recognized by those skilled in the art, the exact order of the steps illustrated and discussed herein may be varied in any advantageous manner without deviating from the present invention. Also, where appropriate, steps may be repeated, skipped or combined to better operate in a given environment.

In the drawings and specification there has been set forth preferred embodiments of the invention, and, although specific terms are used, the description thus given uses terminology in a generic and descriptive sense only and not for purposes of limitation.

We claim:

1. A computer system, comprising:
    an authentication server;
    a client in remote communication with the authentication server;
    a secure gateway machine connected between the authentication server and the client; and
    at least one secure resource in communication with the client;
    wherein the client is configured to store on the client a first authenticated credential received from the authentication server in response to a successful user authentication by utilizing a security method to prevent tampering with the credential;
    wherein the client is configured to use the stored first authenticated credential to access the at least one secure resource without further authenticating the first credential with the server or other authenticating entity while the authentication server is not in operative communication with the client;
    wherein the gateway machine is configured to store a second authenticated credential on the gateway received from the authentication server in response to a successful user authentication by utilizing a security method to prevent tampering with the second credential; and
    wherein the client is further configured to use the second authenticated credential to access the at least one secure resource without further authenticating the second credential with the server or other authenticating entity while the authentication server is not in operative communication with the gateway.

2. The computer system of claim 1, wherein at least one of the client security method and the gateway security method is encryption, and wherein the client is further configured to decrypt the first credential or the second credential, determine whether the decrypted credential has been tampered with, and fail a user authentication request if decrypted credential has been tampered with.

3. The computer system of claim 2, wherein at least one of the client security method and the gateway security method is Public Key Infrastructure, and wherein the client is further configured to decrypt the first credential or the second credential with a key stored on the client, determine whether the decrypted credential has been tampered with, and fail a user authentication request if decrypted credential has been tampered with.

4. The computer system of claim 2, wherein the client is further configured to use the second authenticated credential prior to using the first authenticated credential in accessing the at least one secure resource without further authenticating either first or second credential with the server or other authenticating entity while the authentication server is not in operative communication with the gateway.

5. The computer system of claim 2 wherein the authenticated user credential is a light-weight directory access protocol.

6. A method for providing access to at least one secure resource, comprising:
storing a first authenticated credential received from an authentication server in remote communication via a secure gateway with a client on the client in response to a successful user authentication by utilizing a security method to prevent tampering with the first credential;
submitting a user authentication request to the authentication server;
in response to the user authentication request, the client using the stored first authenticated credential to access the at least one secure resource without further authenticating the first credential with the server or other authenticating entity while the authentication server is not in operative communication with the client;
providing a secure gateway machine connected between the authentication server and the client;
the gateway machine storing a second authenticated credential on the gateway received from the authentication server in response to a successful user authentication by utilizing a security method to prevent tampering with the second credential; and
the client using the second authenticated credential to access the at least one secure resource without either the client or the gateway further authenticating the second credential with the server or other authenticating entity while the authentication server is not in operative communication with the gateway.

7. The method of claim 6, wherein at least one of the client security method and the gateway security method is encryption, further comprising the steps of:
decrypting the first credential or the second credential;
determining whether the decrypted first or second credential has been tampered with; and
failing a user authentication request if the decrypted first or second credential has been tampered with.

8. The method of claim 7, wherein at least one of the client security method and the gateway security method is Public Key Infrastructure, further comprising the step of decrypting the first credential or the second credential with a key stored on the client.

9. The method of claim 8, wherein the step of using the second authenticated credential to access the at least one secure resource without further authenticating said second credential while the authentication server is not in operative communication occurs prior to the step of using the first authenticated credential to access the at least one secure resource without further authenticating said first credential while the authentication server is not in operative communication.

10. The method of claim 6 wherein the authenticated user credential is a light-weight directory access protocol.

11. A method for providing access to at least one secure resource, comprising the steps of:
submitting a user authentication request to an authentication server in remote communication via a secure gateway with a client in use by said user;
in response to a successful user authentication of the user authentication request, receiving an authenticated user credential which is unique to said user, storing said authenticated credential on said client utilizing a client security method, storing said authenticated credential on said gateway utilizing a gateway security method, and using said authenticated credential to access said at least one secure resource;
in response to an unsuccessful user authentication of the user authentication request, determining whether said authentication server is in operative communication with said client;
in response to a determination that said authentication server is in operative communication with said client, erasing from the client any authenticated credential corresponding to said user, erasing from the gateway any authenticated credential corresponding to said user, and failing the user authentication request;
in response to a determination that said authentication server is not in operative communication with said client; determining whether said gateway is in operative communication with said client, and:
in response to a determination that said gateway is in operative communication with said client, searching the gateway for an authenticated credential corresponding to said user, and:
in response to finding an authenticated credential corresponding to said user on the gateway, using said authenticated credential to access said at least one secure resource without further authenticating the credential with the server or gateway or other authenticating entity; or
in response to not finding an authenticated credential corresponding to said user on the gateway, failing the user authentication request; or
in response to a determination that said gateway is not in operative communication with said client, searching the client for an authenticated credential corresponding to said user; and
in response to finding an authenticated credential corresponding to said user, using said authenticated credential to access said at least one secure resource without further authenticating the credential with the server or the gateway or another authenticating entity while said gateway is not in operative communication with said client; or
in response to not finding an authenticated credential corresponding to said user, failing the user authentication request.

12. The method of claim 11, wherein at least one of said gateway and client security methods is encryption of the credential, further comprising the steps of:
decrypting the credential;
determining whether the decrypted credential has been tampered with; and
failing the user authentication request in response to a determination that the decrypted credential has been tampered with.

13. The method of claim 12 wherein the authenticated user credential is a light-weight directory access protocol.

14. The method of claim 12, the wherein at least one of the steps of using said authenticated credential to access said at least one secure resource further comprises the steps of:
determining an elapsed time since a previous remote server authorization;
comparing the elapsed time to a threshold time; and
in response to the elapsed time exceeding the threshold time, failing the user authentication request.

15. The method of claim 12 further comprising the steps of:
assigning a high sensitivity level or a low sensitivity level to the at least one secure resource; and
failing the user authentication request if the at least one secure resource sensitivity level is the high sensitivity level unless the authenticated credential is found on either the server or the gateway.

16. The method of claim 12 wherein at least one of said gateway and client security methods is Public Key Infrastructure, further comprising the steps of:

decrypting the credential with a key stored on the client;

determining whether the decrypted credential has been tampered with; and failing the user authentication request in response to a determination that the decrypted credential has been tampered with.

17. The method of claim 16 wherein said Public Key Infrastructure is hardware-based.

* * * * *